Figure 1:
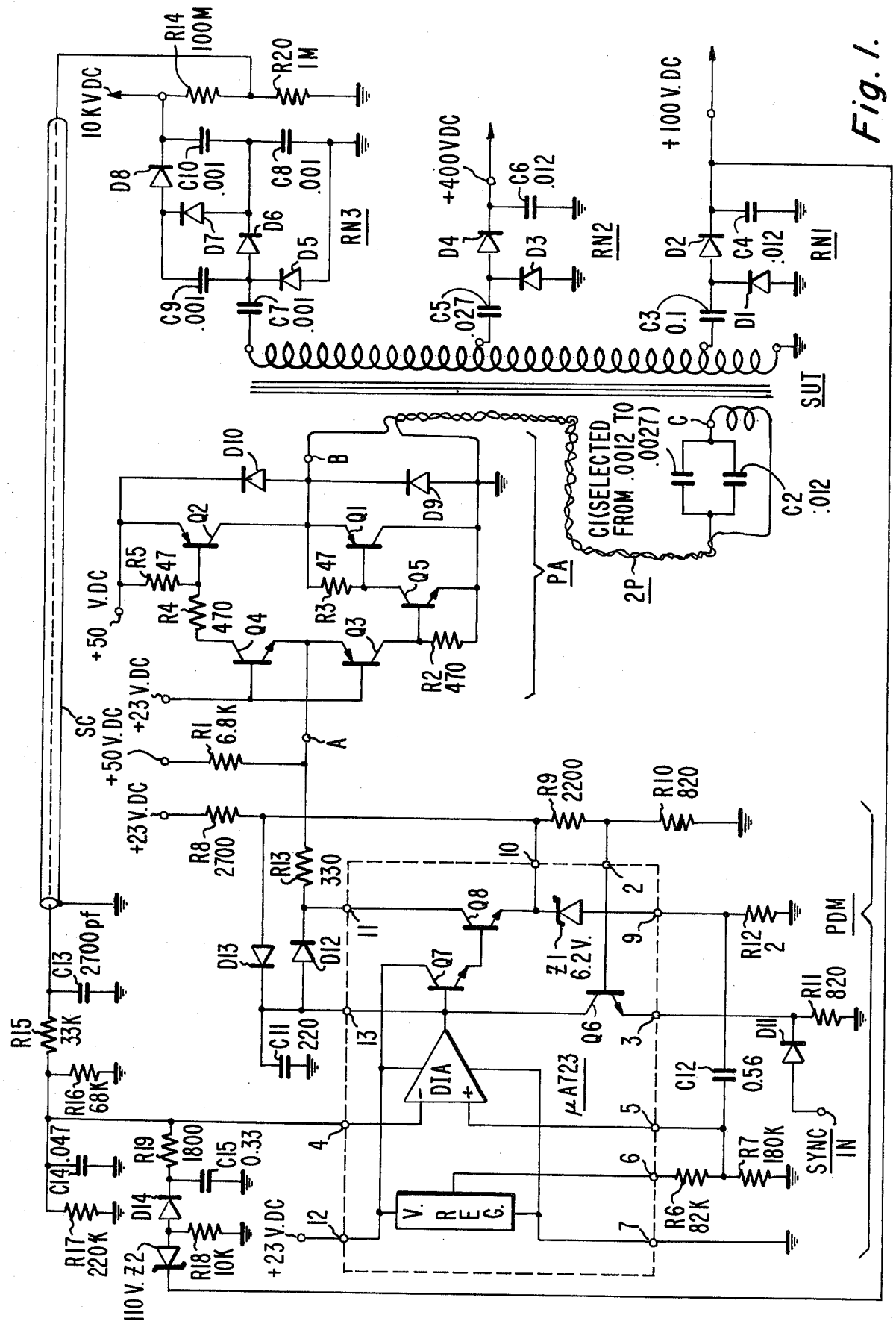

United States Patent [19]
Gamble

[11] 4,128,868
[45] Dec. 5, 1978

[54] D-C CONVERTER USING PULSED RESONANT CIRCUIT

[75] Inventor: Edward B. Gamble, Granada Hills, Calif.

[73] Assignee: RCA Corporation, New York, N.Y.

[21] Appl. No.: 782,751

[22] Filed: Mar. 30, 1977

[51] Int. Cl.² .......................................... H02M 3/335
[52] U.S. Cl. ........................................ 363/26; 332/14; 363/97
[58] Field of Search ............... 331/117 R; 363/16, 18, 363/19, 20, 21, 24–26, 97, 98, 131, 135

[56] References Cited

U.S. PATENT DOCUMENTS

| | | | |
|---|---|---|---|
| 2,965,856 | 12/1960 | Roesel | 331/117 R |
| 3,332,001 | 7/1967 | Schwarz | 363/135 |
| 3,373,334 | 3/1968 | Geisz et al. | 363/26 |
| 3,582,754 | 6/1971 | Hoffmann et al. | 331/117 R |
| 3,596,165 | 7/1971 | Andrews | 363/19 |
| 4,017,784 | 4/1977 | Simmons et al. | 363/98 X |

Primary Examiner—A. D. Pellinen
Attorney, Agent, or Firm—H. Christoffersen; A. L. R. Limberg; J. M. O'Meara

[57] ABSTRACT

A D-C converter obtains high voltage by peak-to-peak rectification of alternating potentials supplied at the secondary of a step-up transformer. The primary winding of the transformer is tuned with series capacitance and driven from the output circuit of a pulse amplifier providing pulses with a repetition rate equal to, or an integral submultiple of, the resonant frequency of the tuned transformer primary. The pulse amplifier is made to offer a low source-impedance so that the Q of the tuned primary is large enough that a substantially sinusoidal voltage with peak-to-peak value several times as large as the amplitude of the pulses supplied by the pulse amplifier appears across the primary. This desirably permits the step-up ratio of the transformer to be reduced.

4 Claims, 2 Drawing Figures

D-C CONVERTER USING PULSED RESONANT CIRCUIT

The present invention relates to d-c converters and, more specifically, to d-c converters suitable for converting the rather modest voltages (e.g., 50 volts) associated with transistor circuit operating supplies to several hundred and/or thousands of volts.

Such d-c converters find use, for example, in providing voltages for cathode ray tube operation in airborne radars, and an embodiment of the present invention suited to that use will be described. In such airborne radars, it is convenient insofar as arranging for the physical packaging of the d-c converter if the step-up transformer and the rectifying networks used to develop potentials for operating the cathode ray tube can be located proximate to the cathode ray tube, while the low-voltage portions of the d-c converter are located together with other low-voltage electronic assemblies.

A d-c converter embodying the present invention includes a step-up transformer, that has its secondary voltage rectified to provide output voltage, and has its primary winding tuned by series capacitance. The resulting series-resonant circuit is driven with pulses having a repetition rate in integral proportion (e.g., 1:1) with its resonant frequency. The Q of the series-resonant circuit is kept high so the primary of the flyback transformer is provided an essentially sinusoidal drive voltage having a peak-to-peak value several times that of the driving pulses. This permits reduction of the step-up ratio of the transformer, making a lighter and more easily constructed transformer.

Figure 2:
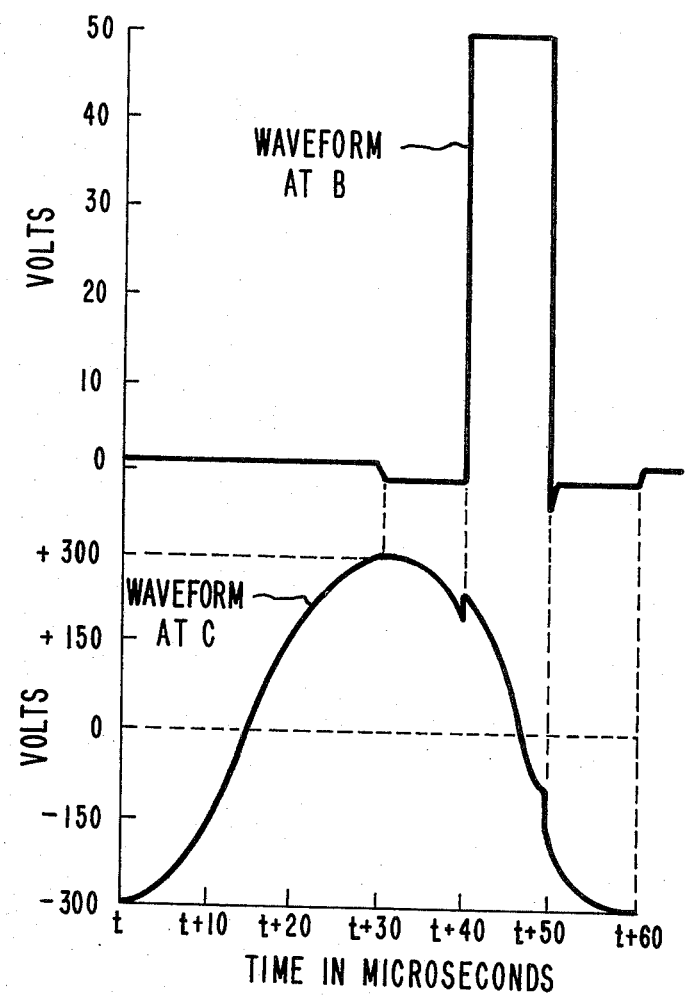

In the drawing:

FIG. 1 is a schematic diagram of the d-c converter, for an airborne radar alluded to above, which embodies the present invention, and FIG. 2 is a timing diagram of important waveforms in the d-c converter of FIG. 1.

In FIG. 1, resistance values are in ohms; and capacitance values, unless otherwise indicated, are in microfarads.

The parallel combination of capacitors C1 and C2 provides a capacitance C1 + C2 that resonates with the inductance of the primary winding of a step-up transformer SUT with which the parallel combination is in series combination. C1 is selected to adjust the resonance to a frequency equal to the repetition rate of the pulses supplied to this series resonant combination from a pulse amplifier PA via a twisted pair 2P. The Q of the series resonant combination is kept high by supplying its drive pulses from a suitably low source impedance and by arranging for the rectifier loading of the secondary winding of the transformer to be sufficiently light and/or the coupling between primary and secondary windings to be sufficiently loose that the primary winding is not too heavily loaded. The drive pulses to the series-resonant circuit have a fundamental frequency component the peaks of which coincide in time with the centers of the pulses. The high Q series-resonant circuit, being tuned to pulse-repetition frequency, presents a high input impedance to all components of the drive pulses except their fundamental frequency. The fundamental frequency is presented a low, essentially resistive impedance, so the current flow through the series resonant circuit is essentially in-phase with the fundamental frequency of the drive pulses and is sufficiently large to cause a substantially sinusoidal quadrature voltage across the primary winding. This quadrature voltage has a peak-to-peak value several times that of the driving pulse voltage. The primary and secondary windings of transformer SUT typically are universally wound on separate legs of a core provided with an air gap. The air gap provides more stable primary inductance with change in transformer temperature. It also reduces the possibility of core saturation and with the rather loose coupling between the windings reduces the coupling of harmonics between the transformer windings. The secondary winding of the step-up transformer SUT is tapped. A first tap supplies a first rectifying network RN1 comprising elements C3, C4, D1, D2 to develop by peak-to-peak rectification a +100VDC voltage at the terminal so labelled. A second tap supplies a second rectifying network RN2 comprising elements C5, C6, D3, D4 to develop by peak-to-peak rectification a +400VDC voltage at the terminal so labelled. The full secondary winding supplies a third rectifying network RN3 comprising elements C7, C8, C9, C10, D5, D6, D7, D8 connected in peak-to-peak voltage doubler configuration to develop a +10KVDC voltage at the terminal so labelled.

By resonating the primary of SUT and driving it with pulses from a sufficiently low-impedance source, the Q of the series resonant circuit it forms with the combined capacitance (C1 + C2) of C1 and C2 can be sufficiently high that the voltage appearing across the primary of SUT can be over ten times the amplitude of the pulses used to drive the series resonant circuit. In the design shown, with the pulses provided by PA swinging over a 50 volts supply range, a 600 volt peak-to-peak waveform, substantially sinusoidal except for the superimposed 50 volt drive pulse at alternate zero-crossings, appears across the primary of SUT—i.e., at terminal C. Current flow through the series-resonant connection of C1 + C2 and the primary of SUT is sinusoidal, since the resonant circuit offers low impedance to only that frequency component of the drive pulse train corresponding to its resonant frequency, so there are substantially no harmonic component currents flowing in the twisted pair 2P. This, plus the cancellation of the fields caused by the fundamental currents flowing in opposite directions in the separate wires of the twisted pair 2P, results in low electromagnetic radiation from the pair. Lead dress where the twisted pair crosses close in the cathode ray tube display is possible without interfering with the deflection of the electron beam.

Pulse amplifier PA has an input terminal A for receiving positive input current during intervals between application of negative input current pulses of controlled duration provided by a pulse duration modulator PDM. These pulses have an ultrasonic (15.54kHz) repetition rate in the FIG. 1 converter synchronized with the line-frame time of the rho-theta circularly scanning radar display. The duration of these negative current pulses is decreased by the pulse duration modulator PDM from somewhat less than 50% duty cycle to an appreciably shorter duty cycle by a degenerative feedback connection from the +10KVDC terminal, as the potential at this terminal is brought up to its prescribed voltage. The pulse duty cycle is kept from exceeding 50% so the degenerative feedback will not become regenerative, causing instability in the voltage regulation. When pulse amplifier PA receives a positive input current at A, its output terminal B will be clamped close to ground potential for current flow into terminal B from the resonated primary winding of SUT by the conduction of transistor Q1 and for current flow out of terminal B by the conduction of diode D9.

For current flow into pulse amplifier PA through terminal B, Q1 is biased into non-saturated clamp by positive current being supplied to terminal A via a bleeder resistor R1 from +50VDC, as follows. The base electrodes of PNP transistor Q3 and NPN transistor Q4 are each biased to +23VDC, and positive current flow to their joined emitter electrodes can forward-bias only the base-emitter junction of the PNP transistor Q3. Q3 responds to the flow of current from +50VDC through R1 and through its emitter electrode with a similar-valued collector current. This current flows through R2 across the base-emitter junction of NPN transistor Q5 in sufficient measure to cause a potential drop thereacross sufficient to forward-bias the base-emitter junction of Q5 to conduct the rest of the collector current of Q3. Q5 responds with collector current that flows through R3 across the base-emitter junction of Q1 in sufficient measure to cause a potential drop thereacross sufficient to forward-bias the base-emitter junction of Q1 to conduct the rest of the collector current of Q5. This portion of the collector current of Q5 is substantial and maintains Q1 in conduction to clamp the output terminal B of pulse amplifier PA 0.7 volt or so above ground when current flows from the tuned primary of SUT.

During the time that Q1 is conducting, the absence of emitter current flow to Q4 causes a resultant lack of collector current flow via resistors R4 and R5 from +50VDC, permitting R5 to maintain the base electrode of PNP transistor Q2 pulled-up so Q2 does not conduct.

R2 and R3 are sufficiently low in resistance that they can rapidly remove stored base charge from Q5 and Q1, respectively, when Q3 is removed from conduction. This happens when the current flow through bleeder resistor R1 is diverted away from input terminal A of pulse amplifier PA by a portion of the demand for current by PDM. The remainder of this demand may be viewed as the application of negative current to the joined emitter electrodes of Q3 and Q4. The negative current is the wrong polarity to flow through the emitter-base junction of Q3 and must flow through the emitter-base junction of Q4, causing it to demand a similar-valued collector current. This collector current demand is supplied through R4, being supplied in sufficient measure through R5 from +50VDC to increase the potential drop across R5 to a point where the emitter-base junction of Q2 is biased into conduction to supply the rest of that demand. Q2 is biased into saturated clamp to apply a 50 volt positive value to output terminal B of PA.

At the conclusion of the application of negative current to terminal A of PA responsive to PDM demanding current, bleeder resistor R1 resumes supplying positive current to terminal A, biasing Q3 into conduction and Q4 out of conduction. With no collector current being demanded by Q4, R5 pulls up the base electrode of Q2 to halt its conduction. R5 is made of sufficiently low resistance that a substantial portion of the stored change is swept out of Q2 during the transition time between conduction in Q4 being terminated and conduction in Q3 being begun. This transition time comes about because terminal A has to swing about 1.4 volt each time there is a transition from conduction in one of transistors Q3 and Q4 and conduction in the other, and before this transition can occur the charge stored in the capacitance associated with terminal A has to be charged in the proper sense. This capacitance will in appreciable part be due to the junction capacitances of the emitter-base junctions of transistors Q3 and Q4 and the stored charge associated with them. R4 is included in the collector connection of Q4, to reduce the thermal dissipation the transistor must be capable of, by reducing the emitter-to-collector voltage of Q4 during its conduction. This permits Q4 to be a less expensive type of transistor and to be physically smaller.

The cascade connection of Q5, Q1 is purposely used rather than a single grounded-emitter NPN transistor to avoid the saturated clamp to ground such an alternative configuration would provide. As current flows into the resonated primary winding of SUT through diode D9 the potential at terminal B drops 0.7 volt below ground. With its collector 0.7 volts negative with respect to its emitter, a grounded-emitter NPN used in lieu of Q1 would be placed into a highly saturated condition, where the entirety of its base current drive would contribute to storing charge in its collector-base junction. When Q2 attempted to apply a +50 volt peak-to-peak output pulse to terminal B, this excessive stored charge would have to be swept out of the NPN in order to turn it off and this would adversely affect its turn-off time. There would be a loss of efficiency due to a high "shoot-through" current through Q2 and the grounded-emitter NPN during any long turn off time of the NPN that increases the overlap in the periods of conduction of the NPN and Q2. Such loss in efficiency would be substantially greater than the loss in efficiency in the circuit shown, which loss of efficiency in the circuit shown results from the PNP Q1 being able to pull the output terminal B of PA only as close to ground as the combined emitter-to-collector saturation voltage of Q5 and base-to-emitter offset potential of Q1 permits. The resonated primary winding of SUT quickly establishes conduction in diode D9 when Q1 can pull down its emitter potential no further and Q1 being non-saturated quickly switches out of conduction so there is low consumption of power by Q1.

On the other hand, allowing Q2 to saturate is not appreciably detrimental to d-c converter efficiency. Stored charge in Q2 is removed prior to turn on of Q1, since Q4 that supplies base current to Q2 is turned off for an appreciable time before Q3 can be turned on to supply base current to Q5. Further, turn-off of Q2 occurs during a period when the resonant circuit requires positive current drive either from Q2 or D9 to satisfy in accordance with Lenz's Law the demands of the collapsing field in the primary winding of transformer SUT, so there is a path provided for sweeping stored charge out of Q2 where the current can be utilized in the d-c conversion process, rather than dissipated in another transistor.

The PDM is built around a single monolithic integrated circuit, the μA 723 built for example by Fairchild Semiconductor or Texas Instruments. The μA 723 includes a voltage regulator V.REG. responsive to +23VDC applied between its pins 7 and 12 to supply a temperature-compensated 7.15 volts at its pin 6. This voltage is divided in a resistive potential-divider comprising off-chip resistors R6 and R7 to provide a bias potential for application to pin 5 of the μA 723. The μA 723 includes a differential-input amplifier DIA having inverting and non-inverting input terminals at pins 4 and 5, respectively of the μA 723 and having an output terminal accessible through pin 13. (In prior art usage of the μA 723, frequency-compensating elements are connected from pin 11 to pin 13, and pin 13 is not used for any other purpose.) The present inventor perceived that DIA functions as a voltage-to-current converter, comparing a control voltage applied to its inverting input terminal via pin 4 with the potential applied to its non-inverting terminal via pin 5 and provides a constant-current output to pin 13. This current of an amplitude determined by the amount by which the voltage at pin 5 exceeds the control voltage applied to pin 4. Absent conduction of transistor Q6, the constant-current source provided by DIA at its output terminal tends to charge capacitor C11, raising the potential on pin 13 to more positive value.

The μA 723 includes an avalanche diode Z1 between its pins 10 and 9. Z1 is maintained in avalanche breakdown by a resistor R8 connecting +23VDC to pin 10, and substantially direct connection of pin 9 via a two-ohm current sensing resistor R12 to ground. A +6.2VDC potential is maintained at pin 10 of the μA 723.

A resistive potential divider comprising resistors R9 and R10 divides the +6.2VDC at pin 10 for applying a positive base bias potential to Q6. Absent conduction by diode D11, this base potential forward-biases the base-emitter junction of Q6, applying by means of the emitter-follower action of Q6 a potential across its emitter resistor R11 for determining the emitter current of Q6. This emitter current causes a like-valued collector current demand by Q6, which is made to be of sufficiently high value as to sink all of the current supplied from the output terminal of DIA and to discharge C11. C11 can be discharged to a potential about 0.7 volt less positive than the +6.2VDC on pin 10; further discharge is prevented by the forward conduction of diode D13 connecting pins 10 and 13.

Positive-going 50%-duty-cycle synchronizing pulses at a 15.54kHz repetition rate are applied to the SYNC IN terminal. Each pulse is conducted by diode D11 to raise the potential drop across R11 and reverse bias the emitter-base junction of Q6 to remove it from conduction. The constant current applied to pin 13 by the output of amplifier DIA then proceeds to charge C11, the rate of its charging depending upon the value of the constant current supplied, as determined by the control voltage at pin 4. When pin 13 rises sufficiently in potential — i.e., about 1.4 volts above the +6.2 VDC on pin 10 — the serially-connected base-emitter junctions of cascaded transistors Q7 and Q8 begin to be forward biased, which restrains further charging of capacitor C11. The emitter current flow of common-collector transistor Q7 is applied to Q8 as base current causing a current flow from the collector to emitter of Q8 that approaches 40 milliamperes in magnitude. The emitter current of Q8 adds to the current flow through Z1 and current sensing resistor R12 to cause an 80 millivolt voltage step thereacross. This step is coupled through capacitor C12 to pin 5 of the μA 723 and thence to the non-inverting input terminal of the amplifier DIA to provide a-c feedback that regenerates conduction of Q8.

The collector current demand of Q8 is satisfied via resistor R13 connecting the collector of Q8 and the input terminal A of pulse amplifier PA. This is done by diverting the current flowing from +50VDC through bleeder resistor R1 from the emitter of Q3, biasing Q3 out of conduction, and by withdrawing additional current from the emitter of Q4, biasing Q4 into conduction. That is, pulse duration modulator PDM applies a negative current pulse to the input terminal A of pulse amplifier PA beginning some time after a positive synchronizing pulse is applied to SYNC IN.

The magnitude of this current pulse is well-defined since as the potential on pin 11 swings down to within about 0.7 volts of the +6.2VDC potential at pin 10, responsive to the potential applied to the base of Q7 by C11 via pin 13, diode D12 becomes forward-biased to clamp pin 11 in potential about 0.7 volts below the potential at pin 13. The potential at the end of R13 connected to terminal A is one base-emitter offset potential (0.7 volts approximately) less than +23VDC when Q8 demands current from the pulse amplifier PA; and, since the potentials at its ends are well-defined, the current through R13 is well-defined in accordance with Ohm's Law.

The duration of the current pulses demanded as collector current by Q8 are determined in the following way. The finish of each pulse comes, of course, shortly after the finish of a synchronizing pulse applied to the SYNC IN terminal, as Q6 is allowed to become once again conductive, to discharge C11 and thus to lower the potential at pin 13, removing forward bias from the base-emitter junctions of Q7 and Q8 and interrupting the flow of current through Q8. The pulse is leading-edge-modulated, rather than trailing-edge modulated. The time between the leading edge of the positive-going synchronizing pulse applied to SYNC IN and the leading edge of the negative-going current pulse applied to terminal A, depends upon the time required to charge C11 from its potential 0.7 volt below +6.2VDC at pin 10, as determined by clamping diode D13, to a potential about 1.4 volts above the +6.2 volts at pin 10, at which point the base-emitter junctions of Q7 and Q8 are forward-biased into conduction. This time interval depends on the rate at which C11 is charged, which in turn depends upon the amplitude of the current supplied from the output terminal of the amplifier DIA to charge C11. As pointed out above, the amplitude of the charging current is determined by the amount by which the control voltage applied to the inverting input terminal of DIA at pin 4 is less positive than that applied to its non-inverting input terminal at pin 5. Because of the high gain of DIA, this voltage difference is normally only a few millivolts.

The control voltage for application to pin 4 is obtained by dividing the +10KVDC potential in a resistive potential divider comprising principally serially connected resistors R14 and R15 working against parallelled resistors R16 and R17. This completes an overall degenerative direct-coupled feedback loop for regulating the +10KVDC output voltage. R14 is located near the rectifying network RN3 and is connected by a shielded cable SC to the remainder of the potential divider. Resistor R20 cooperates with R14 to provide a resistive potential divider that prevents an excessive voltage being placed on the shielded cable SC should its connection to R15, R16, R17 be broken. C13, R15, and C14 filter against electrostatic pick up from the transformer. R17 is a factory selected resistor having a value from 200 to 270 kilohm for trimming R16 so the +10KVDC is adjusted closer to design center. To prevent the +10KVDC supply going excessively high should there be an interruption of the feedback connection for regulating the +10KV potential, a back-up direct-coupled degenerative feedback loop from the +100VDC output of rectifier network RN1 is provided. Should this potential rise substantially above its design value, the 110 volt reverse-breakdown diode Z2 avalanches and develops a potential across resistor R18 sufficient to forward-bias diode D14. When this happens, a direct-coupled degenerative loop is completed through Z2, D14, R19. Capacitors C13, C14 and C15 provide appropriate noise-filtering and phase-compensation in the feedback networks used to develop control voltage for application to pin 4.

When the regulated supply is first put into operation PA responds to the PDM to place a somewhat less than 50% duty-cycle square-wave pulse on point B with timing corresponding to the synchronizing pulse. Insofar as control of the frequency at which the d-c converter is operated, the system is open-loop. Because of this, the primary winding is tuned to the repetition rate of the synchronizing pulses. In a series-resonant system driven from a low-impedance sine-wave voltage source, the voltage across the coil is Q times the driving voltage. In a series resonant system driven from a low-impedance rectangular-pulse-voltage source, the voltage across the coil is Q times the fundamental component of the rectangular pulse. The fundamental component of a rectangular pulse is known from Fourier wave analysis to be $(2A/\pi)/\sin(\pi t_0/T)$ where A is the peak-to-peak amplitude of the pulse and $(t_0/T)$ is its duty cycle. A 50 volt square-wave will have a 63.7 volt peak-to-peak sine wave fundamental, and with a Q of 30 or so, the sinusoidal voltage across the primary winding of the step-up transformer SUT, upon which the 50 volt rectangular pulse will be super-imposed near the zero-crossing, will attempt to grow to some 1900 volts peak-to-peak. This growth is checked by the control voltage at pin 4 of the pulse duration modulator PDM increasing in positive value as the +10KVDC terminal rises in potential; the increasingly positive control voltage narrows the pulse applied to the input terminal A of the pulse amplifier PA, responsive to which the 50 volt peak-to-peak pulses supplied at its output terminal B are correspondingly narrowed.

The loop gain of the control loop is such that the FIG. 1 d-c converter stabilizes with the rectangular pulses at output terminal B of PA having about a 16% duty-cycle and the waveform at point C — i.e., across the primary winding of transformer SUT — having an amplitude of about 600 volts peak-to-peak. FIG. 2 shows these waveforms.

Regulators of the type described can be designed so the duty-cycle of the pulses applied to input terminal A of pulse amplifier PA is less than 50% initially, simply by shortening the duty-cycle of the synchronizing pulses. The gains and thresholds in the voltage regulating loop can be redesigned so the duty cycle of the pulses applied to the input terminal of the pulse amplifier PA under operating conditions is other than 16%. In other applications, output pulses with longer duty cycles, even approaching 100% can be supplied by a pulse duration modulator such as PDM, by lengthening the duty-cycle of the synchronizing pulses. The duty cycle may be lengthened, for instance, until the clamping action of Q6 when conductive is inadequate to discharge C11 sufficiently in an interval between synchronizing pulses to bias D13 into clamp. PDM may be simply adapted for receiving synchronizing pulses of opposite polarity to those applied to the SYNC IN terminal by operating Q6 in common-emitter configuration and applying the pulses to pin 2 of the μA 723.

The FIG. 1 d-c converter is inherently immune to damage arising from short-circuit and over-load conditions and exhibits the following regulation characteristics under full-load, maximum-input-power, and short-circuited output conditions.

| Condition | Input D-c at + 50 VDC (in mA) | Output Voltage (in KV) | Output Current (in μA) |
|---|---|---|---|
| Full-load | 110 | 10 | 150 |
| Maximum-input-power | 150 | 9 | 315 |
| Short-circuited output | 34 | 0 | 880 |

What is claimed is:
1. A regulated power supply comprising:
a pulse duration modulator providing output pulses at a substantially constant repetition frequency, said pulses having a duration that is controlled according to the amplitude of a control voltage of relative low frequency as compared to said repetition frequency;
a pulse amplifier having an input circuit connected to receive the output pulses of said pulse duration modulator and having a low impedance output circuit to supply a first output voltage level while each such output pulse is applied to said input circuit and to supply a second output voltage level during each interval between such output pulses;
a step-up transformer having a primary winding and a secondary winding;
capacitance connected in a resonant combination with said primary winding, said resonant combination being connected across the output circuit of said pulse amplifier, and presenting high Q due to the low impedance thereof, the values of said capacitance and the inductance of said primary winding being chosen so the resonant frequency is substantially equal to an integral multiple, one or more, of the constant repetition frequency whereby the voltage being developed across said primary winding in response to the peak output voltage level of said pulse amplifier is multiplied up by said high Q value;
rectifying means for developing a rectified voltage responsive to the voltage appearing across the secondary winding of said step-up transformer; and
means for applying a portion of said rectified voltage as said control voltage to said pulse duration modulator.

2. A regulated power supply comprising:
a pulse duration modulator providing output pulses at a substantially constant repetition frequency, said pulses having a duration that is controlled according to the amplitude of a control voltage of relative low frequency as compared to said repetition frequency;
a pulse amplifier having an input circuit connected to receive the output pulses of said pulse duration modulator and having an output circuit, the output circuit of said pulse amplifier being switched to a low-source-impedance first output voltage condition during the duration of each output pulse from said pulse duration modulator being applied to its input circuit, the output circuit of said pulse amplifier being switched to a low-source-impedance second output voltage condition during each interval between output pulses from said pulse duration modulator being applied to its input circuit;
a step-up transformer having a primary winding and a secondary winding;

capacitance in series connection with said primary winding across the output circuit of said pulse amplifier, to form a resonant circuit, the values of said capacitance and the inductance of said primary winding being chosen so the resonant frequency is substantially equal to an integral multiple, one or more, of said repetition frequency;

rectifying means for developing a rectified voltage responsive to the voltage appearing across the secondary winding of said step-up transformer;

means for applying a portion of said rectified voltage as said control voltage to said pulse duration modulator; and wherein said pulse amplifier comprises:

first and second supply terminals for receiving an operating potential therebetween;

an output terminal, said resonant circuit being connected between said output terminal and said first supply terminal;

first and second and third transistors of a first conductivity type and fourth and fifth transistors of a second conductivity type complementary to said first conductivity type, each of said transistors having base and emitter electrodes with an emitter-base junction therebetween and having a collector electrode, the emitter and collector electrodes of said first transistor being connected respectively to said output terminal and to said first supply terminal, the emitter and collector electrodes of said second transistor being connected respectively to said second supply terminal and to said output terminal, the collector electrodes of said third and fourth transistors being connected respectively to the respective base electrodes of said fifth and said second transistors, the emitter and collector electrodes of said fifth transistor being connected respectively to said first supply terminal and to the base electrode of said first transistor;

a diode connected between the emitter and collector electrodes of said first transistor in a poling for co-operating with said first transistor to provide bilateral current conduction;

means for applying to an interconnection of the base electrodes of said third and fourth transistors a potential intermediate to the potentials on said first and second supply terminals;

an input terminal for receiving output pulses from said pulse duration modulator of a polarity to cause conduction of said third transistor and subsequently of said fifth and said first transistors and otherwise being biased to receive current of the opposite polarity to cause conduction of said fourth transistor and subsequently of said second transistor, there being a capacitance associated with the interconnection of the emitter electrodes of said third and fourth transistors causing transition times between the conduction of each of said third and fourth transistors and the other; and first, second and third means for discharging stored base charge connected across the emitter-base junctions of said first, second and fifth transistors, respectively, each said means providing substantial discharge of the stored charge of its respective transistor when its base current drive is interrupted in a time shorter than said transition times.

3. A regulated power supply as set forth in claim 2 wherein said pulse duration modulator comprises:

a differential-input amplifier having inverting and non-inverting input terminals, one connected to a first point of fixed potential and the other connected to receive said control voltage, and having an output terminal through which a current flows responsive to the difference in potential between its inverting and noninverting input terminals;

a capacitor connected at one of its plates to the output terminal of said differential input amplifier and at the other of its plates to a point of fixed potential;

means responsive to synchronizing signals for diverting the current from the output terminal of said differential-input amplifier from flowing to charge said capacitor, as it does in the intervals between synchronizing signals, and for discharging said capacitor;

means for constraining the potential across said capacitor decreasing below a prescribed value;

transistor means having an input terminal to which the potential appearing on the first plate of said capacitor is applied, having a common terminal connected to a third point of fixed potential, and having an output terminal, said transistor means being of a conductivity type to be biased conductive by the accumulation of charge in said capacitor responsive to the non-diverted portion of the current from the output of said differential-input amplifier;

a resistance connected between the output terminal of said transistor means and the input terminal of said pulse amplifier for applying an input current of a first polarity to the input terminal of said pulse amplifier responsive to conduction of said transistor means; and means for continuously supplying to the input terminal of said pulse amplifier an input current of a second polarity opposite to said first polarity and of an amplitude smaller than said input current of a first polarity.

4. A pulse duration modulator for the combination of claim 2 comprising:

transistor means having input, output and common electrodes;

a point of reference potential to which the common electrode of said transistor means is connected;

a capacitor having a first plate connected to a point of fixed potential relative to said reference potential and having a second plate;

a resistance connecting the output electrode of said transistor means to a point of operating potential;

a voltage-to-current converter connected to supply a current proportional to applied control voltage to a node to which the second plate of said capacitor and the input electrode of said transistor means each connect, said current being of a plarity tending to charge said capacitor changing the potential at said node in a sense to tend to cause said transistor means to become increasingly conductive, first unilaterally conductive means included in said transistor means and connected between the output and input electrodes of said transistor means in a poling to restrain further charging of said capacitor when said transistor means becomes conductive to a predetermined extent, for controlling the potential to which said capacitor can be charged;

means for recurrently applying a current to said node of opposite polarity to that supplied by said voltage-to-current converter, said current being supplied for a predetermined period at predetermined regular intervals; and second unilaterally conductive means connected between a point of fixed potential relative to said reference voltage and said node, for controlling the potential to which said capacitance can be discharged.

* * * * *